United States Patent Office 2,814,650
Patented Nov. 26, 1957

2,814,650

PROCESS OF TREATING DEHYDROGENATION-HYDROGENATION CATALYSTS

Alfred Clark, Bartlesville, Okla., assignor to Phillips Petroleum Company, a corporation of Delaware No Drawing. Application August 21, 1953,
Serial No. 375,812

21 Claims. (Cl. 260—668)

This invention relates to a method for activating a dehydrogenation-hydrogenation catalyst to improve its catalytic activity, to the catalyst activated by the process, and to the dehydrogenation and hydrogenation of hydrocarbons in contact with said catalyst.

Various hydrocarbons, particularly those containing at least 2, and not more than 10, carbon atoms per molecule must frequently be dehydrogenated or hydrogenated to produce more unsaturated or less unsaturated materials suitable for various purposes in the chemical and petroleum industries. Dehydrogenation reactions commonly utilized include dehydrogenation of butane to produce butenes, dehydrogenation of butenes to produce butadienes, dehydrogenation of other paraffins to produce the corresponding olefins, and dehydrogenation of naphthenes to produce aromatics. The hydrogenation of petroleum fractions containing olefinic materials to effect saturation thereof is frequently desirable.

The principal object of the invention is to provide an activation process for a dehydrogenation-hydrogenation catalyst which produces an improved catalyst for the dehydrogenation and hydrogenation of hydrocarbons. It is also an object of the invention to provide an improved process for the dehydrogenation of dehydrogenatable hydrocarbons. It is also an object of the invention to provide improved catalysts for the dehydrogenation and hydrogenation of hydrocarbons. Other objects of the invention will become apparent from a consideration of the accompanying disclosure.

In accordance with the invention, an improved dehydrogenation-hydrogenation catalyst is prepared by subjecting at least one metal oxide of the group consisting of molybdenum oxide and vanadium oxide to the action of a hydrogen-containing ambient and an ammonia-containing ambient at elevated temperatures in the range of 950° to 1300° F. for a period of at least one-half hour and sufficient to improve the activity of the catalyst over the catalyst which has not been subjected to these activation steps.

The activation treatment preferably comprises contacting the catalyst at an elevated temperature, first with an atmosphere comprising, predominantly, free hydrogen devoid of catalyst poison, and following this treating step immediately, or at least within a very short period of time, with a second contacting step wherein the hydrogen-treated catalyst is contacted with an ammonia-containing ambient at an elevated temperature. The reversed order of the treating steps also effects desired activation of the catalyst and the treatment with ammonia alone is effective in activation of the catalyst but less active catalysts are produced by these embodiments of the invention than those resulting from the hydrogen treatment followed by ammonia treatment.

The activation treatment of the invention is applicable to vanadium oxide and molybdenum oxide dehydrogenation-hydrogenation catalysts in a mixture, or separately, preferably when deposited on, or in intimate admixture with, catalyst carriers or supports, particularly alumina, alone, or in combination with silica. These oxides, in combination with an alumina or silica-alumina carrier, while effective in the dehydrogenation and hydrogenation of hydrocarbons, leave considerable room for improvement as to activity, effective life, efficiency, per pass conversion rate, and stability to regeneration. The instant invention provides considerably improved catalyst composites.

The activation treatment is effective in improving the activity of any of the conventional molybdenum oxide or vanadium oxide dehydrogenation-hydrogenation catalysts singly, in admixture with each other, and either supported or unsupported on such carriers as alumina and alumina-silica. All reasonable proportions of constituents may be incorporated into the catalyst; however, it is preferred to utilize molybdenum oxide and/or vanadium oxide in the range of 5 to 35 percent of the composite, and the balance alumina. It is usually desirable to include in the catalyst composite silica in an amount in the range of 1 to 10 percent by weight of the composite.

The activation treatment of the invention is applicable to catalysts of the desired composition when made by the usual procedures for preparation of such catalysts, including coprecipitation of concentrated sols to produce gel catalysts, mechanical mixing of the components of the catalyst, deposition of active catalytic material on non-catalytic material or less active catalytic material which functions as a support, carrier, and/or promoter for the principal catalytic component. It has been found that the activation process of the invention does not improve the activity of chromia-alumina or iron oxide-silica-alumina catalysts for dehydrogenation or hydrogenation processes.

Activation of the catalyst by treatment in the gaseous ambient is usually performed under similar conditions in each step of the activation, but different conditions may be used, if desired, so long as the treatment in each step is effected under the prescribed conditions. Heating in the specified ambient at a temperature in the range of 950° to 1200° F., for at least one-half hour in each step is generally sufficient to properly activate the catalyst and provide catalysts of considerably higher activity for dehydrogenation and hydrogenation of hydrocarbons than a catalyst containing similar components without the activation treatment. Although the activation is expedited by an increase in temperature, a temperature only slightly above the operating temperature of the dehydrogenation step is preferred, since subsequent cooling is thereby reduced. If desired, temperatures up to the temperature at which deterioration of the catalyst is appreciable can be utilized. The pressure of the hydrogen and ammonia is not critical and may be any that is convenient, such as atmospheric or higher. The hydrogen and ammonia ambients should be relatively pure and free from catalyst poisons, but minor proportions of relatively difficultly adsorbable compounds such as methane or nitrogen are tolerable. A period of about one-half hour or longer in each gaseous atmosphere is usually sufficient for the activation, but the period of activation may be shorter or longer in some instances and may be readily determined by trial.

The catalysts treated by the method of my invention may be used to advantage in the dehydrogenation of any dehydrogenatable hydrocarbon under conditions of temperature, pressure, and reaction time within conventional ranges, such as 800° to 1150° F., atmospheric pressures to about 1000 p. s. i., a feed rate of 0.5 to 5 liquid hourly space velocity, and hydrogen flow of 500 to 5000 cubic feet of hydrogen per barrel of reactants. The catalyst may be regenerated whenever it becomes inactive by burning off the deposited coke in an oxygen-containing atmosphere and, when necessary, again subjecting the catalyst to the action of the hydrogen and ammonia atmospheres in accordance with the invention.

The chemical and/or physical aspects of the catalyst of the invention, after ammonia treatment, which account for its increased activity for dehydrogenating and hydrogenating hydrocarbons are unknown but it is certain that some definite change in the character of the catalyst does occur when it is activated in ammonia at elevated temperatures, particularly when the activation treatment also includes hydrogen treatment.

The following specific examples are intended to illustrate the invention and are not to be interpreted as unduly limiting the same.

EXAMPLE I

A commercially available molybdenum oxide-containing catalyst of a composition of 8 weight percent molybdenum trioxide, 5 weight percent silica and 87 weight percent alumina, was first treated with cylinder hydrogen at a temperature of 1100° F. for a period of 1.8 hours and then treated with cylinder ammonia at an initial temperature of 1100° F., which was reduced to the hydrogenation temperature of 878° F. during a period of 1.8 hours. This treated catalyst was used to dehydrogenate cyclohexane under the process conditions in Table I and resulted in an ultimate yield of aromatics of 85.5 weight percent. In comparison, the same catalyst composite treated in an atmosphere of hydrogen at an initial temperature of 1100° F., reduced to 884° F. during a period of 3.7 hours, resulted in an ultimate yield of aromatics of only 80.0 weight percent in the dehydrogenation of cyclohexane.

*Table I*

| Run number | 1 | 2 |
|---|---|---|
| Catalyst pretreatment: | | |
| Hydrogen: | | |
| Temperature, °F | 1,100 | 1,100 |
| Time, hours | 1.8 | a 3.7 |
| Ammonia | | None |
| Temperature, °F | 1,100 | |
| Time, hours | b 1.8 | |
| Reaction conditions: | | |
| Temperature, °F | 878 | 884 |
| Pressure, p. s. i. a | 315 | 315 |
| LHSV | 1.05 | 1.07 |
| Process cycle length, hours | 2.0 | 2.0 |
| H₂ to hydrocarbon ratio, mol | 6.3 | 6.2 |
| Product: | | |
| Aromatic yield, weight percent | 57.8 | 42.2 |
| Ultimate yield of aromatics, weight percent | c 85.5 | c 80.0 | a Hydrogen was passed over the catalyst while cooling to process temperature.
b Ammonia was passed over the catalyst while cooling to process temperature.
c Calculated assuming MCP and CH to be equally convertible to benzene.

EXAMPLE II

Another catalyst, a commercially available vanadium oxide catalyst of 10 weight percent vanadium oxide and 90 weight percent alumina, was first treated with cylinder hydrogen at a temperature of 1100° F. for 1.9 hours and then treated with cylinder ammonia at an initial temperature of 1100° F., reduced to 881° F. during a period of 1.8 hours. For comparison purposes, the catalyst was also treated with cylinder hydrogen at an initial temperature of 1100° F., reduced to 901° F. during a period of 3.8 hours. As shown in Table II for the dehydrogenation of cyclohexane, the aromatic content of the liquid product was 73 volume percent with the catalyst treated with hydrogen and ammonia and only 40 volume percent with the catalyst not treated with ammonia.

*Table II*

| Run number | 1 | 2 |
|---|---|---|
| Catalyst pretreatment: | | |
| Hydrogen: | | |
| Temperature, °F | 1,100 | 1,100 |
| Time, hours | 1.9 | a 3.8 |
| Ammonia | | None |
| Temperature, °F | 1,100 | |
| Time, hours | b 1.8 | |
| Reaction conditions: | | |
| Temperature, °F | 881 | 901 |
| Pressure, p. s. i. a | 315 | 315 |
| LHSV | 1.1 | 1.1 |
| Process cycle length, hours | 2 | 2 |
| H₂ to hyc ratio, mol | 6.0 | 6.0 |
| Aromatic content of liquid product, volume percent | 73 | 40 | a Hydrogen was passed over the catalyst while cooling to process temperature.
b Ammonia was passed over the catalyst while cooling to process temperature.

I claim:

1. The process of activating a dehydrogenating-hydrogenating catalyst comprising at least one metal oxide of the group consisting of the oxides of vanadium and molybdenum deposited on a carrier or support, which comprises heating said catalyst in a hydrogen-containing ambient free of catalyst poisons at a temperature in the range of 950 to 1300° F. for a period of at least ½ hour and then heating said catalyst in an ammonia-containing ambient free of catalyst poisons at a temperature in said range for a time in said period so as to increase the activity of said catalyst for hydrogenating and dehydrogenating hydrocarbons.

2. The process of claim 1 in which the catalyst contains vanadium oxide.

3. The process of claim 1 in which the catalyst contains molybdenum oxide.

4. A catalyst containing a metal oxide of the group consisting of the oxides of vanadium and molybdenum in intimate association with a carrier or support, said catalyst having been activated by the process of claim 1.

5. The catalyst of claim 4 in which the carrier, or support, comprises principally alumina.

6. The catalyst of claim 5 in which the carrier also contains silica.

7. A catalyst containing 5 to 35 weight percent molybdenum oxide and the balance at least one member of the group consisting of alumina and silica, said catalyst having been activated by the process of claim 1.

8. A catalyst containing 5 to 35 weight percent vanadium oxide and the balance at least one member of the group consisting of alumina and silica, said catalyst having been activated by the process of claim 1.

9. A catalyst consisting essentially of 5 to 35 weight percent molybdenum oxide, 1 to 10 weight percent silica, and the remainder alumina, said catalyst having been activated by the process of claim 1.

10. A catalyst consisting essentially of 5 to 35 weight percent vanadium oxide, 1 to 10 weight percent silica, and the remainder alumina, said catalyst having been activated by the process of claim 1.

11. A process for dehydrogenating a dehydrogenatable hydrocarbon which comprises contacting a hydrocarbon of said classification under dehydrogenating conditions with a catalyst containing at least 1 metal oxide of the group consisting of the oxides of vanadium and molybdenum, said catalyst having been activated by contacting same with a hydrogen-containing ambient relatively free of catalyst poisons at a temperature in the range of 950° to 1300° F. for a period of at least one-half hour and separately contacting same with an ammonia-containing ambient relatively free of catalyst poisons at a temperature in said range for a time in said period so as to increase the activity of said catalyst for dehydrogenating said hydrocarbon.

12. The process of claim 11 in which said metal oxide is intimately admixed with a carrier, or support, comprising alumina.

13. The process of claim 12 in which the support, or carrier, also includes silica.

14. The process of claim 13 in which the catalyst consists essentially of 5 to 35 weight percent of molybdenum oxide, 1 to 10 weight percent of silica, and the balance of alumina.

15. The process of claim 13 in which the catalyst consists essentially of 5 to 35 weight percent of vanadium oxide, 1 to 10 weight percent of silica, and the balance of alumina.

16. A process for hydrogenating a hydrogenatable hydrocarbon which comprises contacting a hydrocarbon of said class under hydrogenating conditions with a catalyst comprising at least one metal oxide of the group consisting of the oxides of vanadium and molybdenum, said catalyst having been activated by contacting same with a hydrogen-containing ambient relatively free of catalyst poisons at a temperature within the range of 950 to 1300° F. for a period of at least one-half hour and separately contacting said catalyst with an ammonia-containing ambient relatively free of catalyst poisons at a temperature in said range for a time in said period so as to increase the activity of said catalyst for hydrogenating said hydrocarbon.

17. The process of activating a dehydrogenating-hydrogenating catalyst comprising molybdenum oxide deposited on a carrier or support, which comprises heating said catalyst in an ammonia-containing ambient free of catalyst poisons at a temperature in the range of 950 to 1300° F. for a period of at least ½ hour and heating said catalyst in a hydrogen-containing ambient at a temperature in said range for a period of at least ½ hour so as to increase the activity of said catalyst for hydrogenating and dehydrogenating hydrocarbons.

18. The process of claim 16 wherein the contacting with hydrogen is effected prior to the contacting with ammonia.

19. The process of claim 11 wherein said hydrocarbon contains at least 2 and not more than 10 carbon atoms per molecule.

20. The process of claim 16 wherein said hyrocarbon contains at least 2 and not more than 10 carbon atoms per molecule.

21. The process of activating a dehydrogenating-hydrogenating catalyst comprising at least one metal oxide of the group consisting of the oxides of vanadium and molybdenum deposited on a carrier or support, which comprises heating said catalyst in a hydrogen-containing ambient relatively free of catalyst poisons at a temperature in the range of 950 to 1300° F. for a period of at least ½ hour and separately heating said catalyst in an ammonia-containing ambient relatively free of catalyst poisons at a temperature in said range for a time in said period so as to increase the activity of said catalyst for hydrogenating and dehydrogenating hydrocarbons.

References Cited in the file of this patent

UNITED STATES PATENTS

| 2,395,058 | Mattox | Feb. 11, 1942 |
| 2,450,639 | Denton et al. | Oct. 5, 1948 |
| 2,604,438 | Bannerot | July 22, 1952 |

U. S. DEPARTMENT OF COMMERCE
PATENT OFFICE
CERTIFICATE OF CORRECTION

Patent No. 2,814,650

November 26, 1957

Alfred Clark

It is hereby certified that error appears in the printed specification of the above numbered patent requiring correction and that the said Letters Patent should read as corrected below.

Column 1, line 39, after "hydrocarbons." insert the following sentence —

> Another object of the invention is to provide an improved process for the hydrogenation of hydrogenatable hydrocarbons.

Signed and sealed this 15th day of April 1958.

(SEAL)

Attest:

KARL H. AXLINE
Attesting Officer

ROBERT C. WATSON
Commissioner of Patents